(12) United States Patent
Leekley et al.

(10) Patent No.: US 11,043,245 B2
(45) Date of Patent: Jun. 22, 2021

(54) SYSTEM AND METHOD FOR COMPILING A SINGULAR VIDEO FILE FROM USER-GENERATED VIDEO FILE FRAGMENTS

(71) Applicant: Remote Media, LLC, Wheaton, IL (US)

(72) Inventors: Gregory H. Leekley, Charlotte, NC (US); Alexander Savenok, Grandview, MO (US); Pavel Savenok, Wheaton, IL (US)

(73) Assignee: Vertigo Media, Inc., Charlotte, NC (US)

( * ) Notice: Subject to any disclaimer, the term of this patent is extended or adjusted under 35 U.S.C. 154(b) by 0 days.

(21) Appl. No.: 16/289,443

(22) Filed: Feb. 28, 2019

(65) Prior Publication Data

US 2019/0267042 A1     Aug. 29, 2019

Related U.S. Application Data

(60) Provisional application No. 62/636,298, filed on Feb. 28, 2018.

(51) Int. Cl.
*G11B 27/10* (2006.01)
*G11B 20/10* (2006.01)

(52) U.S. Cl.
CPC ........ *G11B 27/10* (2013.01); *G11B 20/10527* (2013.01); *G11B 2020/10537* (2013.01)

(58) Field of Classification Search
CPC .......................... G11B 27/10; G11B 20/10527
See application file for complete search history.

(56) References Cited

U.S. PATENT DOCUMENTS

| | | | | |
|---|---|---|---|---|
| 2012/0004960 A1* | 1/2012 | Ma | ..................... | G06Q 30/0241 705/14.4 |
| 2013/0163963 A1* | 6/2013 | Crosland | ............. | H04N 9/8211 386/285 |
| 2017/0220315 A1* | 8/2017 | Lin | .......................... | H04R 3/12 |
| 2017/0289220 A1* | 10/2017 | Bloch | ..................... | H04L 65/80 |

* cited by examiner

*Primary Examiner* — Girumsew Wendmagegn
(74) *Attorney, Agent, or Firm* — Christopher J. Scott

(57) ABSTRACT

A system and method are operable within a computer network environment for compiling a singular video file from user-generated video file fragments for playback in tandem with a context-providing audio file. The system includes at least one client operable to generate at least one video file fragment in tandem with audio file content simultaneously consumable via each client. Each video file fragment is generated at or between a select start time and at a select end time during playback of a select audio file content segment, the parent audio file of which segment has a universally unique identifier. A remote service system compiles the video file fragments into a video file fragment compilation for playback progression in tandem with playback of the audio file content based on the select start and end time of the video file fragments as associated with select audio file content segments of the audio file.

16 Claims, 2 Drawing Sheets

SYSTEM AND METHOD FOR COMPILING A SINGULAR VIDEO FILE FROM USER-GENERATED VIDEO FILE FRAGMENTS

PRIOR HISTORY

This application claims the benefit of U.S. Provisional Patent Application No. 62/636,298 filed in the United States Patent and Trademark Office on 28 Feb. 2018.

BACKGROUND OF THE INVENTION

Field of the Invention

The present invention generally relates to system and method for compiling a cohesive, singular video file from video file fragments in tandem with audio material as a context for the video footage.

Brief Description of Prior Art

United States Patent Application Publication No. 2014/0164563, authored by Leekley et al., describes a content delivery network for delivering select data files to an end user. The content delivery network provides a client, a P2P gateway server, and a Resource Name Server (RNS) within a computer-populated network. The RNS caches data resource locations within the computer-populated network and resolves resource requests with optimal data resource locations within the computer-populated network. The gateway server requests and receives optimal data resource locations via the RNS; requests and receives data files from the computer-populated network via the optimal data resource locations; and processing received data files for data file delivery to the client. The network thus enables an origin-agnostic data delivery method for optimally delivering select data files to an end user. A data-routing governance or management utility governs/manages the content delivery network and associated methodology for providing industry rights management, compliance monitoring, and/or compliance reporting of data file transmissions.

United States Patent Application Publication No. 2017/0041280, authored by Savenok et al., describes certain smart routing synchronization systems for socializing a synthetic rebroadcast or group stream for enabling members of a user group to (re)broadcast select content to other members of the user group and collaboratively curate content delivery. The systems are based on a content-identification process and further a process for (re)broadcasting content. These processes are cooperable among a group of member clients each of which are in communication with at least two content sources. The synchronization process identifies select content and directs delivery of the content from an optimal resource for each member client via a smart routing protocol. The (re)broadcast process prompts delivery of the select content to members of the user group from a content origination member of the group, and group members are thereby able to simultaneously access the content for the purpose of providing a content-based platform for social interaction.

SUMMARY OF THE INVENTION

The system and method according to the present invention provides users with a mechanism for enhancing a song listening experience with video enhancements. The so-called Song Stories enabled by the system and method according to the present invention are basically user-generated video fragments associated with a musical composition each of which have a specific start time or position within the associated musical composition at which the user-generated video fragment is to be played. The present invention enables multiple users to provide multiple user-generated video file fragments that are combined to make a single unified video composition that places the different user-generated video file fragments into their proper place in the compilation based on the content start time within the musical composition.

The system and method according to the present invention basically or essentially describe a system and/or method operable within a computer network environment typified or exemplified by the computer network environments more exhaustively described in US Patent Application Publication No. 2014/0164563, authored by Leekley et al. and US Patent Application Publication No. 2017/0041280, authored by Savenok et al. as hereby incorporated by reference thereto. The system and method according to the present invention basically functions to compile a singular video file from user-generated video file fragments for playback in tandem with a context-providing audio file.

The system and/or method according to the present invention may be said to essentially comprise at least one client exemplified by a mobile communications device, but preferably a series of clients, each of which may be operable to capture or generate at least one video file fragment in tandem with and response to audio file content that is simultaneously consumable via each client. Each video file fragment may be captured by the client device at a select start time and at a select end time during playback of a select audio file content segment or portion of the audio file content, which audio file content is exemplified by a musical composition or track having a universally unique identifier or UUID.

The system and/or method according to the present invention further preferably comprises a remote service system that basically operates to compile the user-generated video file fragments into a video file fragment compilation, the playback of which progresses in tandem with playback of the audio file content based on the select start and end time of each video file fragment as associated with a select audio file content segment of the audio file content as further identified via the universally unique identifier or UUID thereby providing a UUID-affiliated audio file.

The universally unique identifier or UUID is preferably abstract and resolvable for allowing the remote services system and the at least one client to associate the at least one video file fragment with corresponding audio file content as sourced to the respective clients from across multiple content providers as discussed in more detail in US Patent Application Publication No. 2014/0164563, authored by Leekley et al. and US Patent Application Publication No. 2017/0041280, authored by Savenok et al. as prefaced hereinabove.

The system according to the present invention may further operate to present the at least one video file fragment and the select audio file segment together as a social media post for allowing peripheral users to interact with the at least one video file fragment coupled with the select audio file content segment. In this regard, the remote service system allows the peripheral users to respond to the social media post or posts with segment commentary for ranking the at least one video file fragment and the select audio file content segment amidst competing video file fragments associated with the select audio file content segment. This ranking process helps rank and/or position competing video file fragments for any given audio file content segment. A higher ranking video file fragment may thus displace a lower ranking video file fragment for any given or select audio file segment.

Each participating client may then send a playback request for the video file fragment compilation by sending the universally unique identifier or UUID to the remote service system, which remote service system responds to the playback request with the video file fragment compilation in tandem with the UUID-affiliated audio file content or audio file associated or affiliated with the UUID. The audio file may be preferably sourced to the respective clients via the systems made the subject of US Patent Application Publication No. 2014/0164563, authored by Leekley et al. and US Patent Application Publication No. 2017/0041280, authored by Savenok et al. as prefaced hereinabove.

The clients then play the video file fragment compilation and the UUID-affiliated audio file content at or from the same playback position, in a synchronized manner, with same speed playback as controlled via the use of dynamic playback rates and a rate-governing algorithm. The remote service system further operates to fill any devoid portions of the video file fragment compilation with empty content for allowing the video file fragment compilation to play seamlessly between positioned fragmentary content. Further, either the client or the remote service system according to the present invention may preferably pad raw user-generated video file fragments with filler content, said filler content being added at either the beginning and/or the end of the raw user-generated video file fragments for creating filler-added video file fragments and ensuring that the filler-added video file fragments start and end at precise time markers for enhancing stream delivery.

BRIEF DESCRIPTION OF THE DRAWINGS

Other features of the invention will become more evident from a consideration of the following brief descriptions of patent drawings.

DETAILED DESCRIPTION OF THE PREFERRED SYSTEM AND METHODOLOGY

Figure 1:
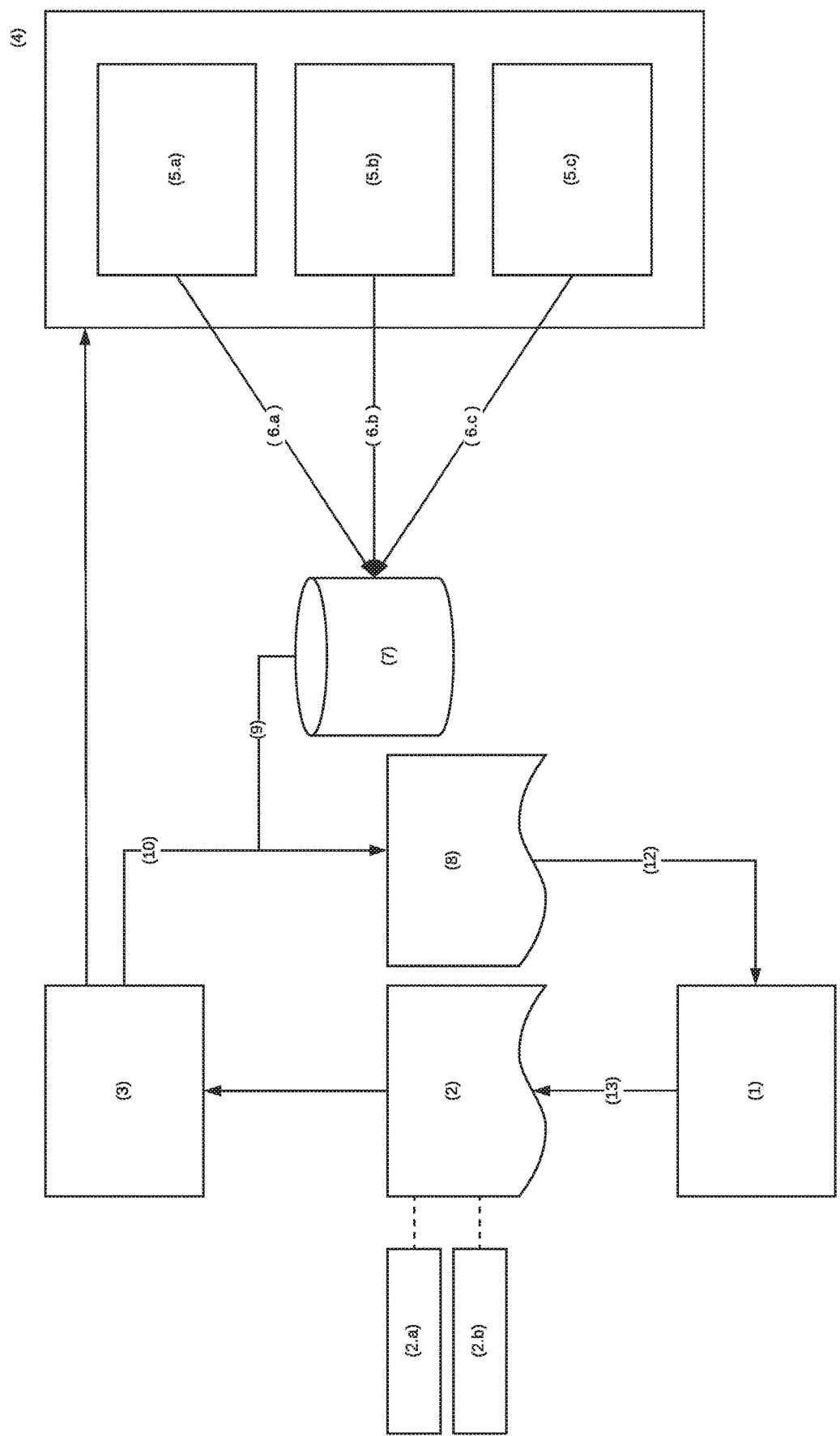
FIG. 1 is a flowchart diagram of the systemic components according to the present invention depicting a client in communication with a back end service system and a storage database for contributing video file fragments in tandem with musical composition selections redistributable as social posts.

Referring now to the drawings with more specificity, the preferred system and associated methodology according to the present invention primarily comprises or is supported by the following major components: at least one client as depicted and referenced at (1) and a remote service system as generally depicted and referenced at (3). Each client typified by a mobile communications device, and outfitted with non-transitory computer-implementable software, enables the user to (a) generate or capture video content in the form of a video file fragment as generally depicted and referenced at (2); (b) select an audio track (e.g. a musical composition or track/song) as an audio context for the captured/generated video file fragment (2); and (c) a start time at which to play the user-generated video file fragment (2) in tandem with playback of the musical composition or track/song within the selected audio track.

The remote or back end service system as depicted and referenced at (3) may preferably present in a social feed or social post as at (4) the individually-created or user-generated video file fragments (2) in combination with associated or select audio file content segments as social posts as at (5.a, 5.b, 5.c, etc.) for user consumption. The client (1) likewise enables users to cast votes or other social commentary feedback on the individual user-generated video file fragments (2) as presented by the remote or back end service system (3) and may further preferably operate to register the user feedback or social commentary as at (6.a, 6.b, 6.c, etc.) in a storage database as at (7) via the back end or remote service system (3). The back end or remote service system (3) then preferably uses the registered user feedback (6.a, 6.b, 6.c) of peripheral users to determine select user-generated video file fragment content (2) that should be played when there is a conflict in start times (e.g. multiple user-generated video file fragment content with overlapping start times or durations) by using user votes or feedback (6.a, 6.b, 6.c) to determine/rank content popularity, and thereby further determine the user-generated video file fragment or content (2) that outranks other content for placement into any given segment of the video file fragment compilation as generally depicted and referenced at (8) associated with the select audio file content (e.g. musical composition or track/song).

The client (1) generates the user-generated video file fragment or video content (2) and it is either converted (a) on the client side into HTTP Live Streaming or HILS fragments with a m3u8 playlist as at (13), or (b) as a server sided fragment or one operable to perform this function on behalf of the client (1). The user-generated content or video file fragment (2) preferably comprises two data pieces associated with it that are critical for compilation data or support. The first of these two data pieces is start time data as depicted and referenced at (2.a). The start time data piece (2.a) is the position in select audio file content exemplified by a musical composition/track at which the user has recorded/captured/generated the video content or video file fragment (2).

The second of these two data pieces is the unique identifier as at (2.b) for the musical composition/track or select audio file. The unique identifier (2.b) is preferably an abstract, resolvable universally unique identifier (UUID) or abstractly resolvable UUID allowing the back end or remote service system (3) and the client (1) to associate the video content or video file fragment (2) with the appropriate musical composition or track: song across multiple content providers as variously and preferably sourced to the various participating client(s) (1) via the systems and methods as more exhaustively discussed in US Patent Application Publication No. 2014/0164563, authored by Leekley et al. and US Patent Application Publication No. 2017/0041280, authored by Savenok et al. as prefaced hereinabove.

The user-generated video content or video file fragment (2) is sent to the back end or remote service system (or group of services) (3). The back end or remote service system (3) or group of services perform the following functions. The back end or remote service system or group of services (3) presents the user-generated video content or video file fragment (2) in a social feed as at (4) for allowing users to interact with the user-generated video content or video file fragment(s) (2) as social media posts (5.a-5.c) allowing users to provide feedback (6.*a*-6.*c*) in response to the social media posts (5.*a*-5.*c*), as for example in the form of votes, comments, likes and flags in response to the user-generated content or video file fragment(s) (2).

The client (1) uses the UUID (2.*b*) associated with the musical composition or track and the playback start time (2.*a*) to play the user-generated video content or video file fragment (2) in tandem with the musical composition or track in synchronization with the user-generated video content, utilizing the track UUID (2.*b*) to route to a preferred service provider's legally compliant access point or copy and synchronize playback using the start time (2.*a*) and a dynamic playback rate algorithm. The back end or remote service system (3) then stores this user's interaction data (i.e. user data (9)) at the storage database (7) as associated with the user-generated video content or video file fragment (2) as further affiliated with a musical composition UUID (2.*b*).

The back end or remote service system (3) then utilizes the user data (9) and user-generated video content or video file fragment (2) (which has preferably been fragmented for http streaming delivery as a video file fragment playlist or compilation (8)) for the specified musical composition or track, and the musical composition or track UUID (2.*b*) to compile an m3u8 playlist or some other form of http streamable playlist (e.g. DASH) for a specific musical composition or track via the musical composition or track UUID (2.*b*). This content can be generated on demand or via script on a timer.

The client (1) then requests as at (12) to play the video file fragment compilation or playlist (8) by sending the musical composition or track UUID (2.*b*) to the hack end or remote service system (3), which system (3) responds with the video file fragment compilation or playlist (8) for the specified musical composition or track. The client (1) plays the musical composition or track and video file fragment compilation or playlist (8) at or from the same playback position. Thus, at musical composition or track position 0, the system according to the present invention enables the client (1) to play the video file fragment compilation or playlist (8) at or from an identical position 0. The video file fragment compilation or playlist (8) and the selected audio file content or musical composition are preferably synchronized using dynamic playback rates. The dynamic playback rate algorithm seeks to have the video file fragment compilation or playlist (8) playback and musical composition playback progress at the same speed.

Figure 2:
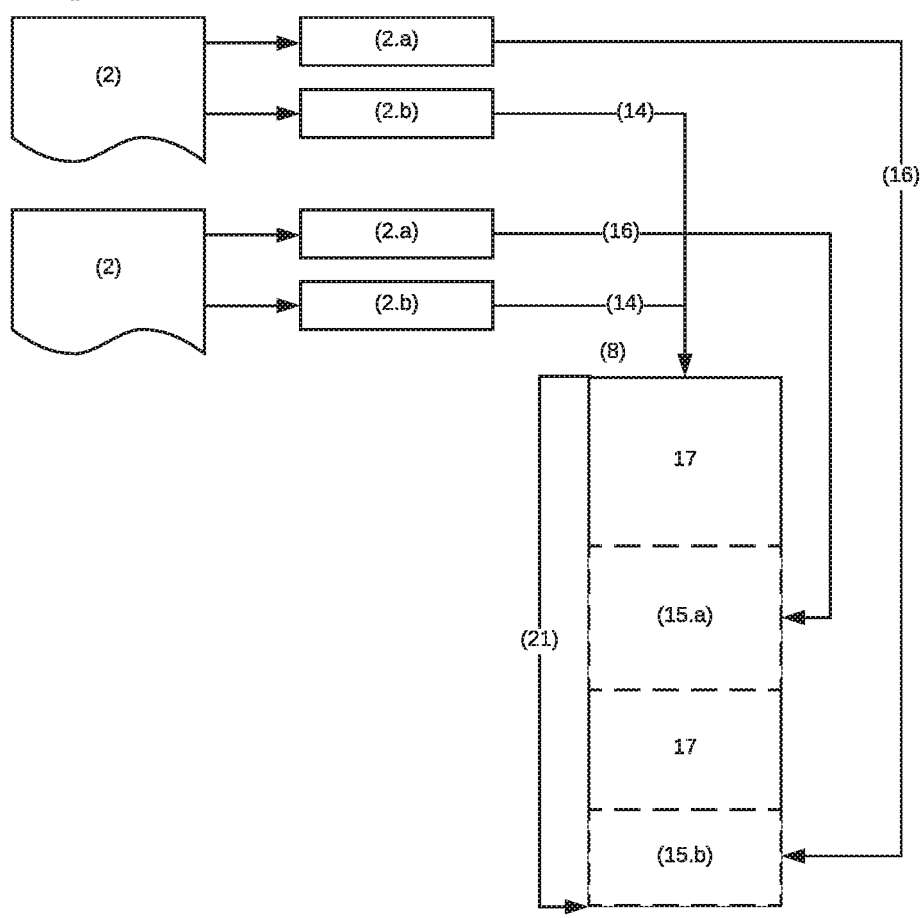
FIG. 2 is a flowchart diagram detailing the back end service system according to the present invention depicting the mechanism for generating Song Story compositions.

Referencing FIG. 2, the reader will generally consider certain finer details of Song Story Composition Generation according to the present invention. The expression Song Story basically refers the video file fragments that users associate with any given portion of an audio file typified by a musical track or composition. The video file fragment compilation or playlist is generated within the back end or remote service system (3). The duration (21) of the video file fragment compilation (8) (i.e. an HLS or similar stream) is equivalent to the duration of the musical composition or track represented by the musical composition or track UUID (2.*b*). Each video file fragment (2) of the user-generated content is affiliated with a musical composition or track UUID (2.*b*) that determines as at (14) that composition segment of the video file fragment compilation or playlist (8) in which the video file fragment (2) will appear. The playback start time (2.*a*) will determine as at (16) at what time as at (15.*a*. 15.*b*) in the video file fragment compilation (8) the user-generated video content or video file fragment (2) will appear.

The back end or remote service system (3) fills those portions of the video file fragment compilation or playlist (8) that has no user-generated video content or video file fragment(s) (2) with empty content as at (17) to allow the video file fragment compilation or playlist (8) to play seamlessly between positioned content (15.*a*, 15.*b*). This simplifies the process of synchronizing aggregated composition content with musical composition playback, since the aggregated composition content is positioned (16) within the video file fragment compilation or playlist (8) stream at the exact position it should appear in playback of the musical composition or track. This allows the client (1) to synchronize the two pieces of content (the musical composition or track and video file fragment compilation or playlist (8)) by ensuring that they are at the same playback position, and by using a dynamic playback rate algorithm to ensure that they stay at the same playback position.

Figure 3:
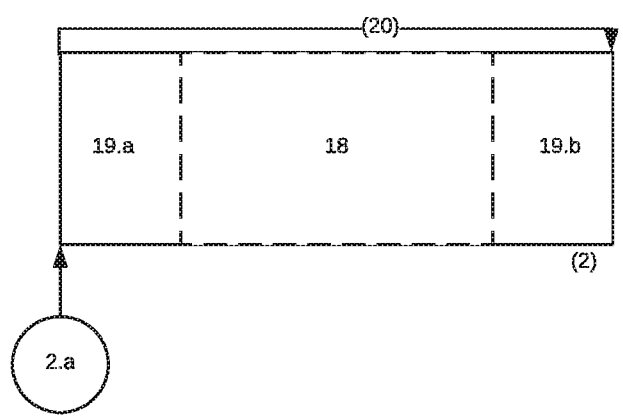
FIG. 3 is a flowchart diagram detailing the mechanism by which users generate content according to the present invention.

Referencing FIG. 3, the reader will consider certain finer details in the process of generating user content or the user's video file fragment (2). The user-generated video content or video file fragment (2) is generated in a manner that can result in gaps between content fragments in the video file fragment compilation or playlist (8). The reason for this is that the content-associated start time (2.*a*) can be positioned at any millisecond of a musical composition or track. The problem with this is that in order for the video file fragment compilation or playlist (8) to playback consistently and synchronize properly, every frame of the stream must be properly positioned. This means that empty content fragments (17) could end up being prohibitively small, as small as a single frame.

This would dramatically affect the ability of the player to reproduce the (or similar) stream without staggering or consistent buffering. To avoid this problem, either the client (1) or the back end or remote service system (3) pads the raw user-generated video content or video file fragment as at (18) with filler content as at (19.*a*, 19*b*) at the beginning and end of the raw user-generated video content (18) to ensure that the modified or filler-added user-generated video content or video file fragment (2) starts and ends at an exact second (20). This ensures that the empty fragment (17) that the back end or remote service system (3) needs to insert will not need to be smaller than a second in length, which enables significantly smoother streaming (12) for the client (1).

While the foregoing specifications set forth with finer specificity a number of systemic embodiments, the specifications are believed to basically or essentially describe a system and/or method operable within a computer network environment typified or exemplified by the computer network environments more exhaustively described in US Patent Application Publication No. 2014/0164563, authored by Leekley et al. and US Patent Application Publication No. 2017/0041280, authored by Savenok et al. as hereby incorporated by reference thereto. The system and method according to the present invention basically functions to compile a singular video file from user-generated video file fragments for playback in tandem with a context-providing audio file.

The system and/or method according to the present invention may be said to essentially comprise at least one client exemplified by a mobile communications device, but preferably a series of clients, each of which may be operable to capture or generate at least one video file fragment in tandem with and response to audio file content that is simultaneously consumable via each client. Each video file fragment may be captured by the client device at a select start time and at a select end time during playback of a select audio file content segment or portion of the audio file content, which audio file content is exemplified by a musical composition or track having a universally unique identifier or UUID.

The system and/or method according to the present invention further preferably comprises a remote service system as at (3) that basically operates to compile the user-generated video file fragments into a video file fragment compilation, the playback of which progresses in tandem with playback of the audio file content based on the select start and end time of each video file fragment as associated with sequentially seamless playback of the full audio file content as further identified via the unique identifier or UUID thereby providing a UUID-affiliated or identifier-affiliated audio file.

The universally unique identifier or UUID is preferably abstract and resolvable for allowing the remote services system and the at least one client to associate the at least one video file fragment with corresponding audio file content as sourced to the respective clients from across multiple content providers as discussed in more detail in US Patent Application Publication No. 2014/0164563, authored by Leekley et al. and US Patent Application Publication No. 2017/0041280, authored by Savenok et al. as prefaced hereinabove.

The system according to the present invention may further operate to present the at least one video file fragment and the select audio file segment together as a social media post for allowing peripheral users to interact with the at least one video file fragment coupled with the select audio file content segment. In this regard, the remote service system allows the peripheral users to respond to the social media post or posts with segment commentary for ranking the at least one video file fragment and the select audio file content segment amidst competing video file fragments associated with the select audio file content segment. This ranking process helps rank and/or position competing video file fragments for any given audio file content segment. A higher ranking video file fragment may thus displace a lower ranking video file fragment for any given or select audio file segment.

Each participating client may then send a playback request for the video file fragment compilation by sending the universally unique identifier or UUID to the remote service system, which remote service system responds to the playback request with the video file fragment compilation in tandem with the UUID-affiliated audio file content or audio file associated or affiliated with the UUID. The audio file may be preferably sourced to the respective clients via the systems made the subject of US Patent Application Publication No. 2014/0164563, authored by Leekley et al. and US Patent Application Publication No. 2017/0041280, authored by Savenok et al. as prefaced hereinabove.

The clients then play the video file fragment compilation and the UUID-affiliated audio file content at or from the same playback position, in a synchronized manner, with same speed playback as controlled via the use of dynamic playback rates and a rate-governing algorithm. The remote service system further operates to fill any devoid portions of the video file fragment compilation with empty content for allowing the video file fragment compilation to play seamlessly between positioned fragmentary content. Further, either the client or the remote service system according to the present invention may preferably pad raw user-generated video file fragments with filler content, said filler content being added at either the beginning and/or the end of the raw user-generated video file fragments for creating filler-added video file fragments and ensuring that the filler-added video file fragments start and end at precise time markers for enhancing stream delivery.

Accordingly, although the invention has been described by reference to certain preferred systemic embodiments and certain associated methodologies, it is not intended that the novel systemic embodiments and associated methods be limited thereby, but that modifications thereof are intended to be included as falling within the broad scope and spirit of the foregoing disclosures and the appended drawings.

What is claimed is:

1. A system operable within a computer network environment for compiling a singular video file from user-generated video file fragments for playback in tandem with a context-providing audio file, the system comprising:
    at least one client, the at least one client being operable to generate at least one video file fragment in tandem with audio file content simultaneously consumable via the at least one client, the at least one video file fragment being generated at a select start time and at a select end time during playback of a select audio file content segment, the audio file content having a unique identifier thereby providing an identifier-affiliated audio file; and
    a remote service system, the remote service system for compiling the at least one video file fragment into a video file fragment compilation for progressive playback in tandem with audio file content playback based on the select start and end times of the at least one video file fragment as sequentially associated with the identifier-affiliated audio file whereby the video file fragment compilation and the identifier-affiliated audio file are synchronized using dynamic playback rates;
    the unique identifier being abstract and resolvable for allowing the remote services system and the at least one client to associate the at least one video file fragment with corresponding audio file content across multiple content providers as variously and preferably sourced to multiple clients.

2. The system of claim 1 wherein the remote service system is operable to present the at least one video file fragment and the select audio file segment together as a social media post for allowing peripheral users to interact with the at least one video file fragment and the select audio file content segment.

3. The system of claim 2 wherein the remote service system allows the peripheral users to respond to the social media post with segment commentary for ranking the at least one video file fragment and the select audio file content segment amidst competing video file fragments associated with the select audio file content segment.

4. The system of claim 1 whereby the client may send a playback request for the video file fragment compilation by sending the unique identifier to the remote service system, the remote service system responding to the playback request with the video file fragment compilation in tandem with the identifier-affiliated audio file.

5. The system of claim 4 whereby the client is operable to playback the video file fragment compilation and the identifier-affiliated audio file at the same play back position.

6. The system of claim 1 wherein the remote service system fills devoid portions of the video file fragment compilation with empty content for allowing the video file fragment compilation to play seamlessly between positioned fragmentary content.

7. The system of claim 1 whereby either the client or the remote service system pads raw user-generated video file fragments with filler content for creating filler-added video file fragments, the tiller content thus for ensuring that the filler-added video file fragments start and end at precise time markers for enhancing stream delivery.

8. The system of claim 7 whereby the filler content is added at either the beginning and/or the end of the raw user-generated video file fragments.

9. A method operable within a computer network environment for compiling a singular video file from user-generated video file fragments for playback in tandem with a context-providing audio file, the method comprising the steps of:

generating at least one video file fragment via at least one client in tandem with simultaneous audio file content consumption via the at least one client, the at least one video file fragment being generated at a select start time and at a select end time during playback of a select audio file content segment during audio file content consumption, the audio file content having a unique identifier thereby providing an identifier-affiliated audio file;

compiling the at least one video file fragment into a video file fragment compilation via a remote service system for playback progression in tandem with playback of the audio file content based on the select start and end time of the at least one video file fragment as sequentially associated with the identifier-affiliated audio file; and synchronizing the video file fragment compilation and the identifier-affiliated audio file using dynamic playback rates, the unique identifier being abstract and resolvable for allowing the remote services system and the at least one client to associate the at least one video file fragment with corresponding audio file content across multiple content providers as variously and preferably sourced to multiple clients.

10. The method of claim 9 wherein the remote services system is operable to present the at least one video file fragment and the select audio file segment together as a social media post for allowing peripheral users to interact with the at least one video file fragment and the select audio file content segment.

11. The method of claim 10 wherein the remote service system allows the peripheral users to respond to the social media post with segment commentary for ranking the at least one video file fragment and the select audio file content segment amidst competing video file fragments associated with the select audio file content segment.

12. The method of claim 9 whereby the client may send a playback request for the video file fragment compilation by sending the unique identifier to the remote service system, the remote service system responding to the playback request with the video file fragment compilation in tandem with the identifier-affiliated audio file.

13. The method of claim 12 whereby the client is operable to playback the video file fragment compilation and the identifier-affiliated audio file at the same playback position.

14. The method of claim 9 wherein the remote service, system fills devoid portions of the video file fragment compilation with empty content for allowing the video file fragment compilation to play seamlessly between positioned fragmentary content.

15. The method of claim 9 whereby either the client or the remote service system pads raw user-generated video file fragments with filler content for creating filler-added video file fragments, the filler content thus for ensuring that the filler-added video file fragments start and end at precise time markers for enhancing stream delivery.

16. The method of claim 15 whereby the filler content is added at either the beginning and/or the end of the raw user-generated video file fragments.

* * * * *